(12) United States Patent
Walker

(10) Patent No.: US 6,382,636 B1
(45) Date of Patent: May 7, 2002

(54) DRILL/DRIVER CHUCK

(75) Inventor: Andrew Walker, Newton Hall (GB)

(73) Assignee: Black & Decker Inc., Newark, DE (US)

(*) Notice: Subject to any disclaimer, the term of this patent is extended or adjusted under 35 U.S.C. 154(b) by 0 days.

(21) Appl. No.: 09/538,435

(22) Filed: Mar. 29, 2000

(30) Foreign Application Priority Data

Mar. 31, 1999 (GB) .............................................. 9907468

(51) Int. Cl.[7] .............................................. B23B 31/12
(52) U.S. Cl. .......................... 279/60; 279/140; 279/902; 408/240
(58) Field of Search ............................. 279/60–65, 140, 279/902; 408/240

(56) References Cited

U.S. PATENT DOCUMENTS

| | | |
|---|---|---|
| 2,531,285 A | 11/1950 | Manspeaker |
| 3,229,554 A | 1/1966 | Haddad |
| RE26,280 E | 10/1967 | Hostetter |
| 3,354,759 A | 11/1967 | Cook |
| 3,600,986 A | 8/1971 | Baldwin, Jr. |
| 3,647,231 A | 3/1972 | Schafer |
| 3,732,026 A * | 5/1973 | Peters .......................... 408/240 |
| 4,297,756 A | 11/1981 | Lance |
| 4,407,493 A | 10/1983 | Okolischan |
| 4,648,608 A | 3/1987 | Smith |
| 4,701,083 A | 10/1987 | Deutschenbaur et al. |
| 5,820,134 A | 10/1998 | Subils Valls |

FOREIGN PATENT DOCUMENTS

| | | |
|---|---|---|
| GB | 1106726 | 3/1968 |
| GB | 2173720 | 10/1986 |
| GB | 2199776 | 7/1988 |

OTHER PUBLICATIONS

EZ Lock Packaging Materials, Rolson® Quality Tools, Date Unknown.

* cited by examiner

Primary Examiner—Steven C. Bishop
(74) Attorney, Agent, or Firm—Bruce S. Shapiro; Michael P. Leary

(57) ABSTRACT

A drill/driver chuck mechanism has a cylindrical member 2 with a central axial bore 4. A plurality of further bores 6 are slanted with respect to the central axial bore 4. Jaws 8 each associated with a bore 6 are moveable via a jaw actuator 10. A jaw locking means 32–60 is coupled to the jaw actuator 10. The jaw locking means may move between an open position and a closed position such that the jaws may be locked within their respective bore 6 regardless of the degree of protrusion of the jaws 8 into the central axial bore 4.

9 Claims, 10 Drawing Sheets

DRILL/DRIVER CHUCK

The present invention relates to a drill/driver chuck mechanism and to a drill/driver including such a chuck. The invention has particular, although not exclusive, relevance to such a chuck as used on consumer do it yourself products and the like.

Chucks for holding a drill bit or a screwdriver bit have been known for many years. In the do it yourself market, the chucks generally comprise an inner cylindrical hollow core to which a plurality of jaws are held at an angle. The jaws may move into and out of the hollow core thereby clamping a bit therewithin. In order to advance or retract the jaws, the jaws carry a threaded portion. This threaded portion co-operates with a threaded collet member which is generally held circumferentially around the jaws and is able to rotate freely, yet is axially immovable. Thus, on rotation of the collet member, the threads co-operate to advance or retract the jaws.

Whilst the above mode of advancing or retracting the jaws is generally acceptable, it does suffer from some short-coming. In order for the chuck to accommodate different diameter bits, the degree or advancing or retracting of the jaws in order to grip these different diameter bits will vary. Large diameter bits will require the jaws to be retracted further yet not advanced particularly far in order to grip the bit in place. Conversely, a small diameter drill bit will need the jaws advanced a relatively long way into the hollow cylinder before gripping the bit. Equally, retraction of the jaws when the bit is of a small diameter need not be particularly far to release the bit.

Generally, the user of the chuck mechanism has to advance or retract the jaws a suitable distance dependent upon the diameter of the bit being grasped.

It is an object of the present invention to alleviate the above short-coming by providing a drill/driver chuck mechanism wherein the degree of advancement or retraction of the jaws is automatically compensated for, yet the force with which the bit is gripped by the jaws is not dependent upon this advancement or retraction. According to the present invention, therefore, there is provided a drill/driver chuck mechanism including:

a cylindrical member having a central axial bore and a plurality of further bores, such that the plurality of further bores are slanted with respect to the axis of the cylindrical member, and co-operate with the central axial bore;

a plurality of jaws, each jaw being associated with a respective one of the further bores and moveable therewithin;

a jaw actuator, coupled to each of the jaws of the plurality, for moving the jaws within their respective further bores;

and jaw locking means arranged to lock the jaws in a predetermined position within their respective bores;

the chuck mechanism characterised by the jaw locking means having an open position and a closed position and wherein, when the jaw locking means is in the open position the jaws are retracted within their respective bores and do not protrude within the central axial bore, and wherein when the jaw locking means is in the closed position, the jaws are locked within their respective bores regardless of the degree of protrusion of the jaws into the central axial bore.

Preferably, the jaw locking means comprises a handle actuable to move between the open position and the closed position. This allows ease of use of the mechanism for a do it yourself enthusiast.

Additionally, or alternatively, the jaw locking means is operatively coupled to the jaw actuator and causes the jaw actuator to move along the axis of the cylindrical member when the jaw locking means is moved between the open position and the closed position. This allows a straight line advancing or retraction of the jaws, without the need for any rotation about the central axial bore.

Advantageously the handle is coupled to a pivotable actuator able to pivot under action of the handle moving between the open position and the closed position, thereby to advance or retract the jaws within their respective bores. Furthermore the pivotable actuator may cause axial movement of the jaw actuator.

Preferably the jaw locking means has an over-centre locking arrangement. This allows for rigid clamping of the jaws about a bit.

Advantageously the jaw locking means includes adjustable biasing means for setting the extent of protrusion of the jaws within the central axial bore. Furthermore the jaw locking means may include a pair of co-operable wedge members able to lock against each other.

The present invention will now be described, by way of example only and with reference to the accompanying drawings of which;

Figure 1:
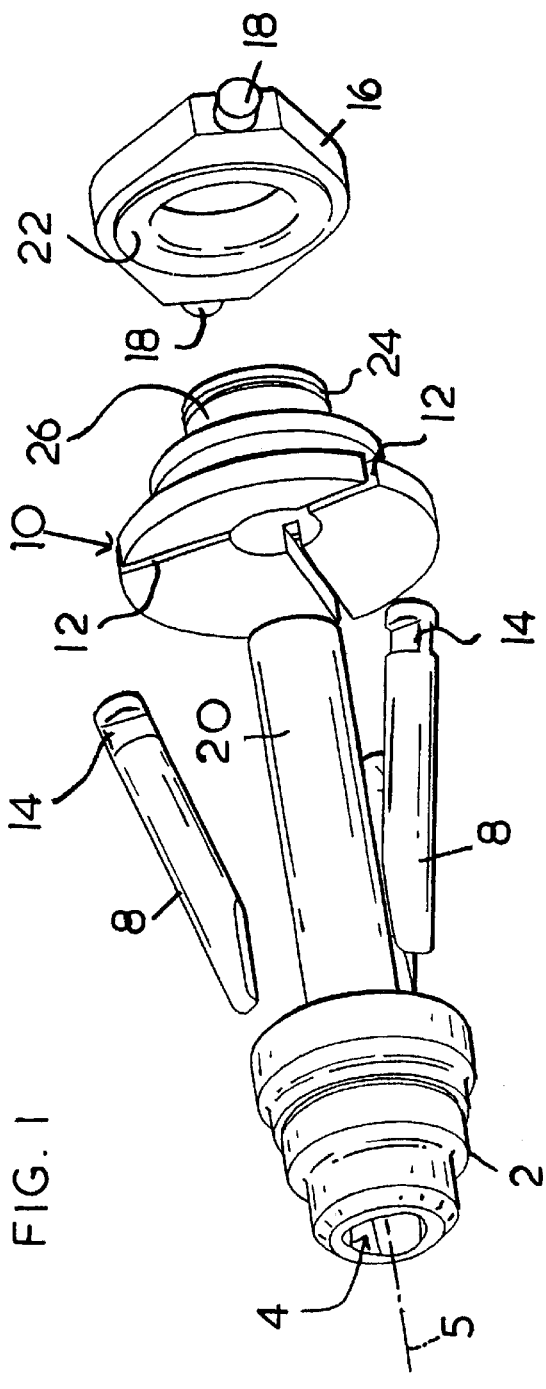
FIG. 1 illustrates an exploded perspective view of the major portions of a chuck in accordance with an embodiment of the present invention.
Figure 2:
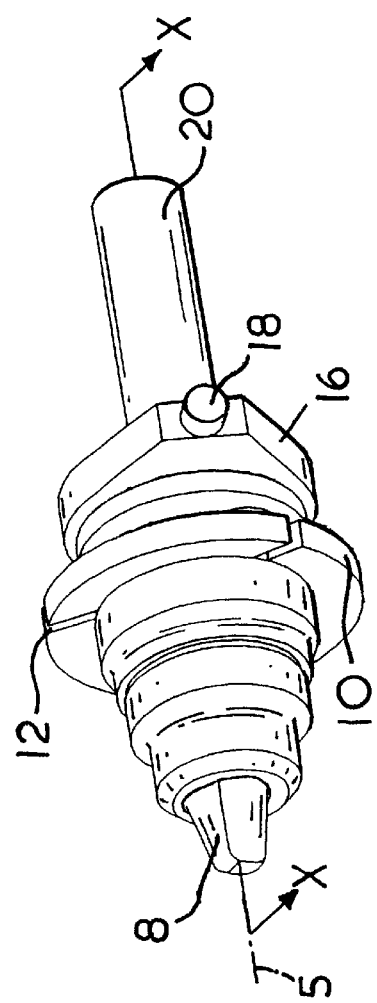
FIG. 2 illustrates the components of FIG. 1, but in an assembled, non-exploded format.
Figure 3A:
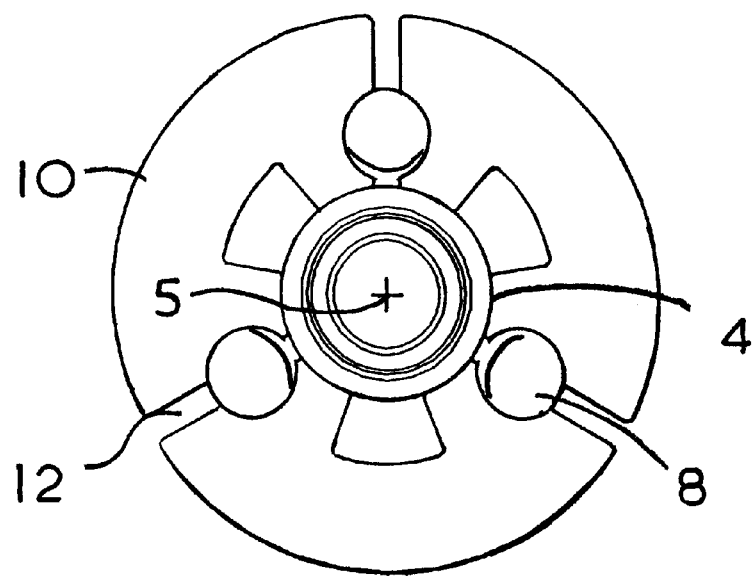
Figure 3B:
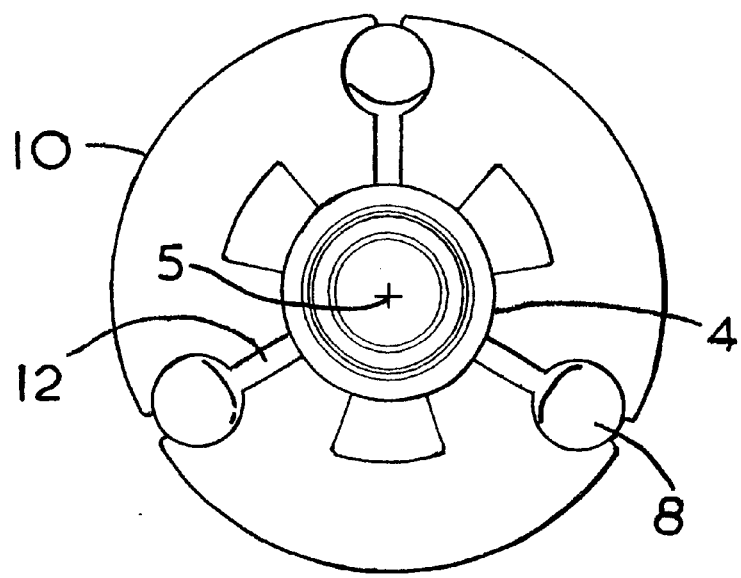
Figure 3C:
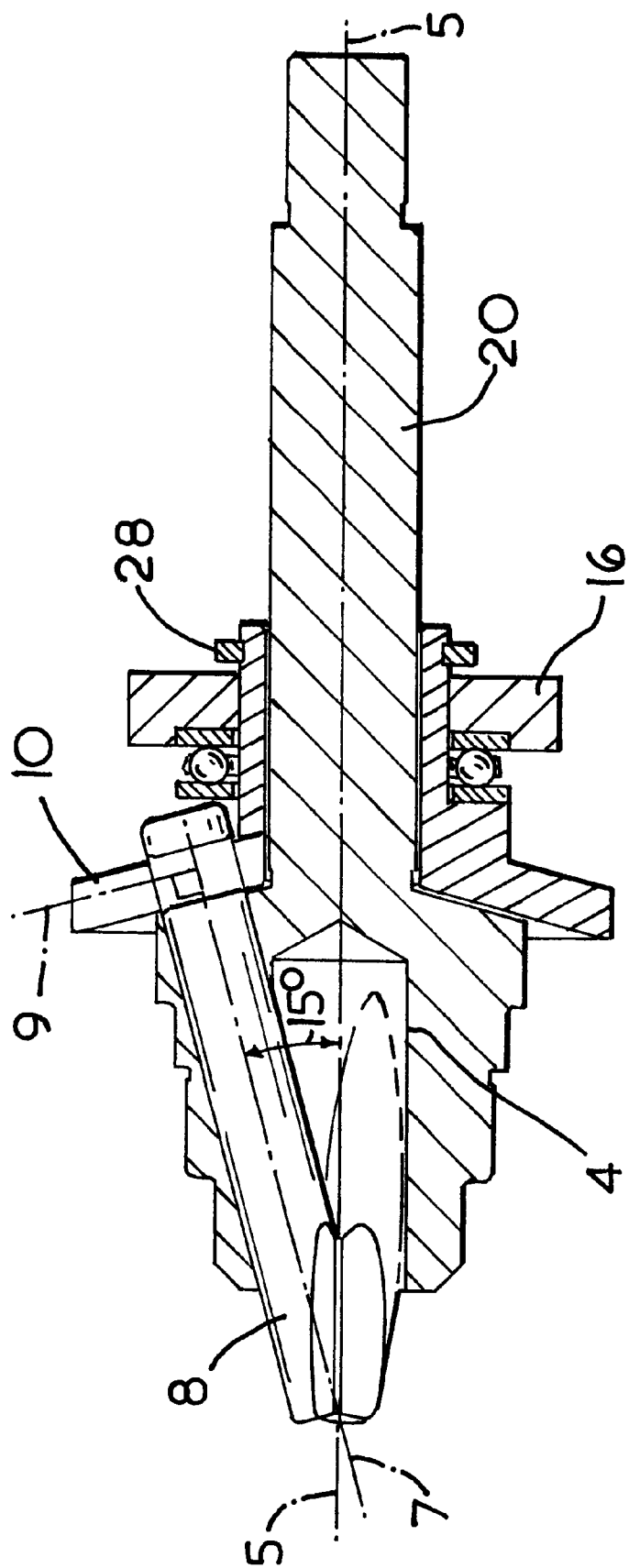
Figure 4:
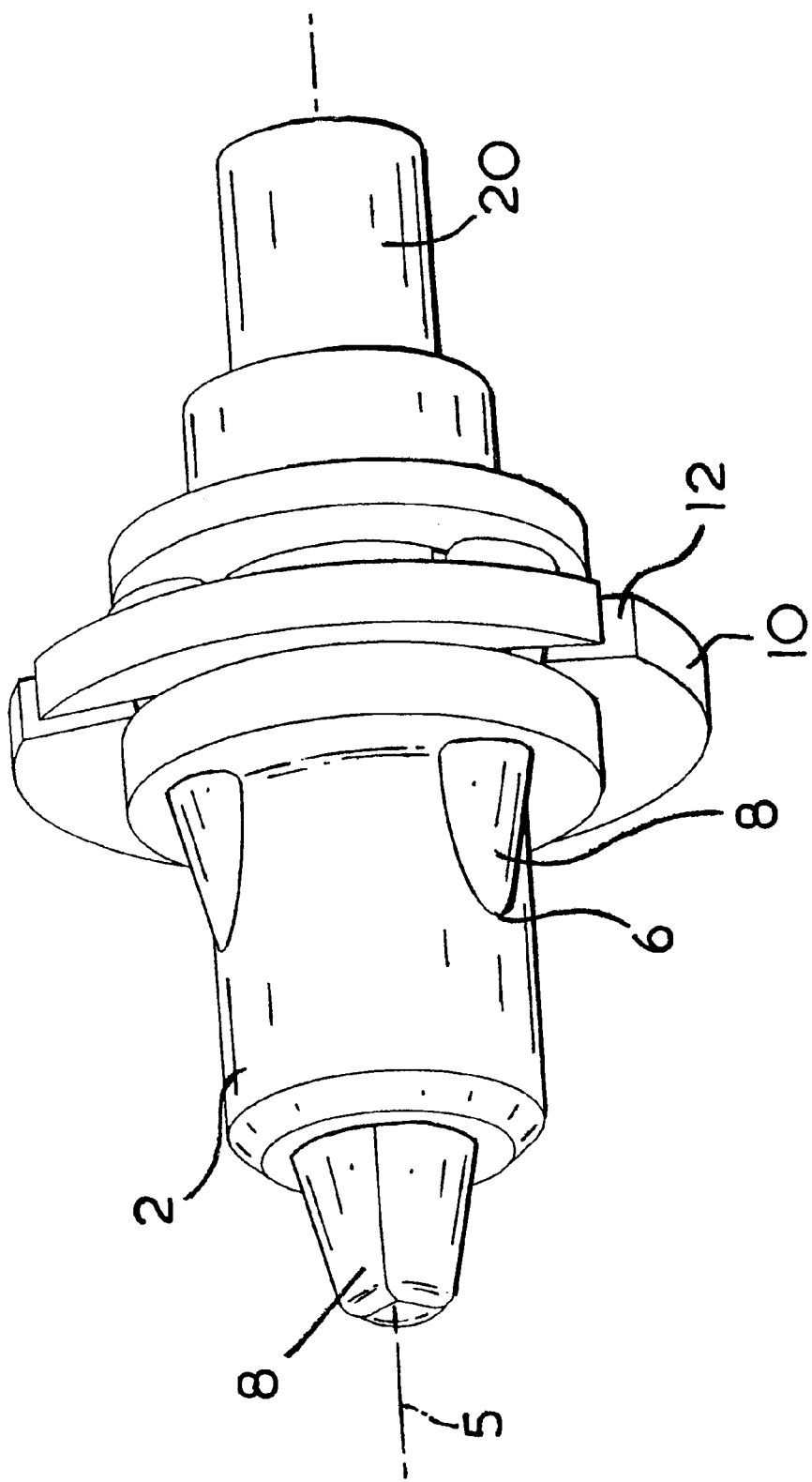
Figure 5:
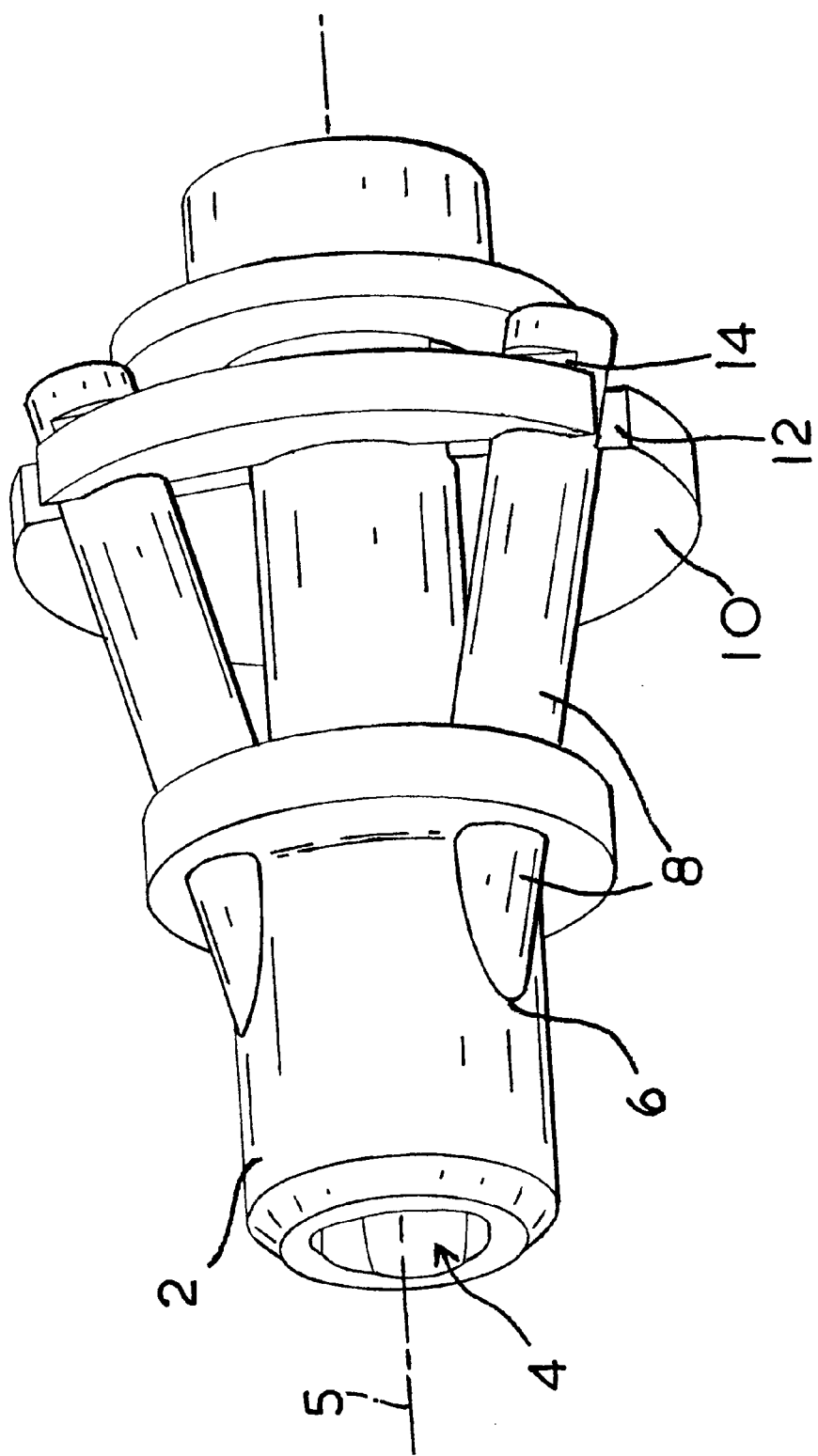
Figure 6:
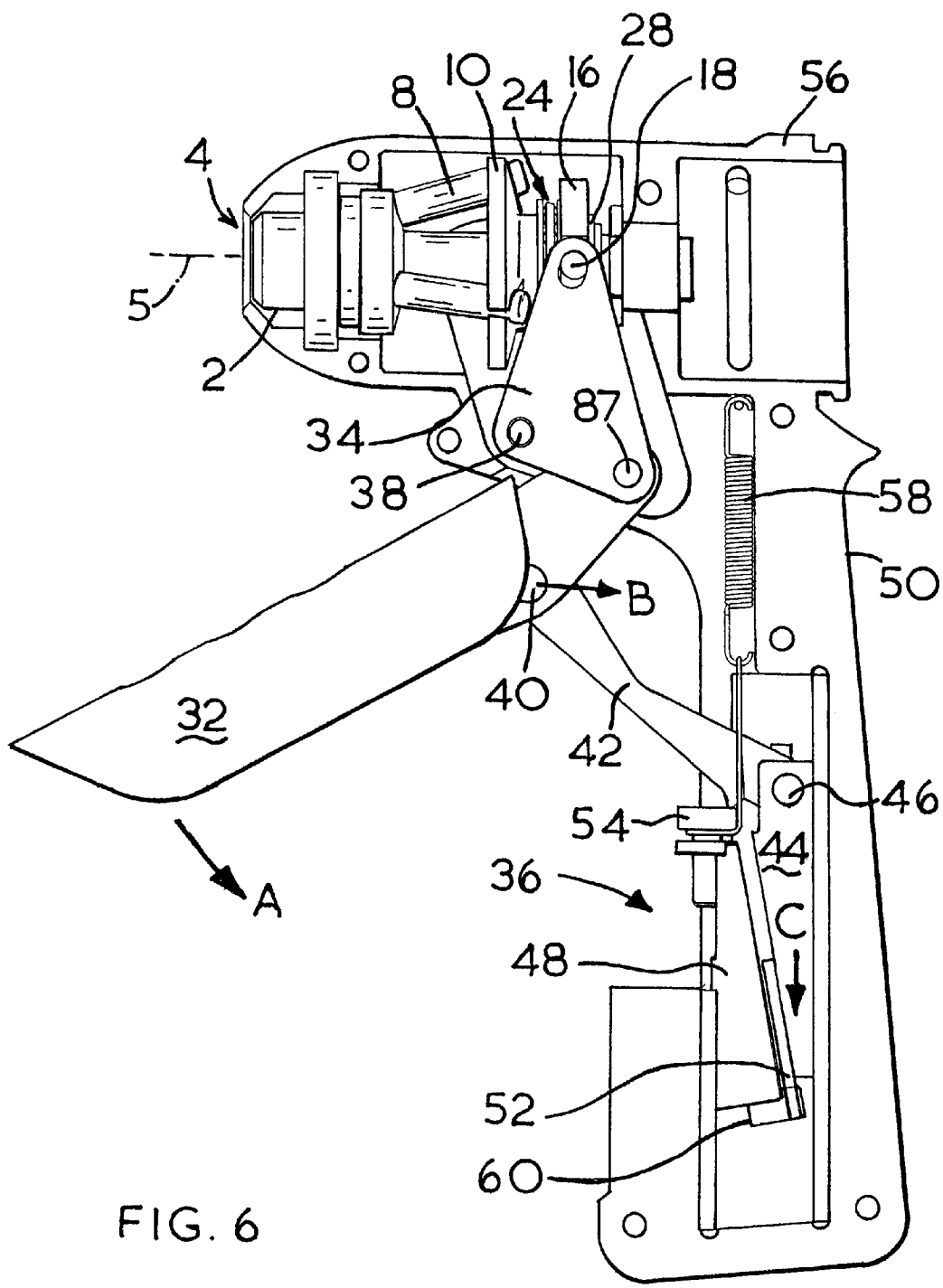
Figures 7, 7A:
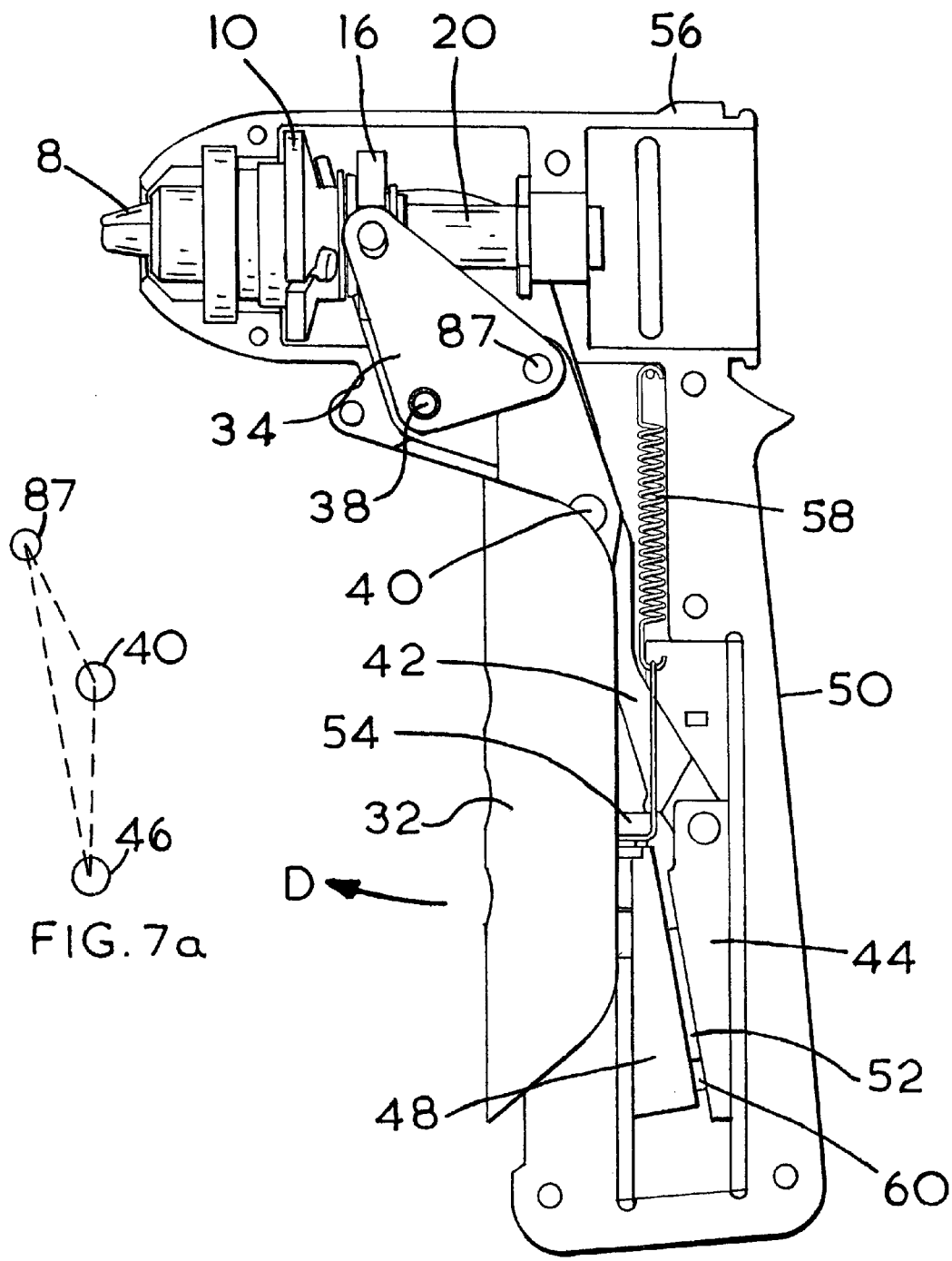
Figure 8:
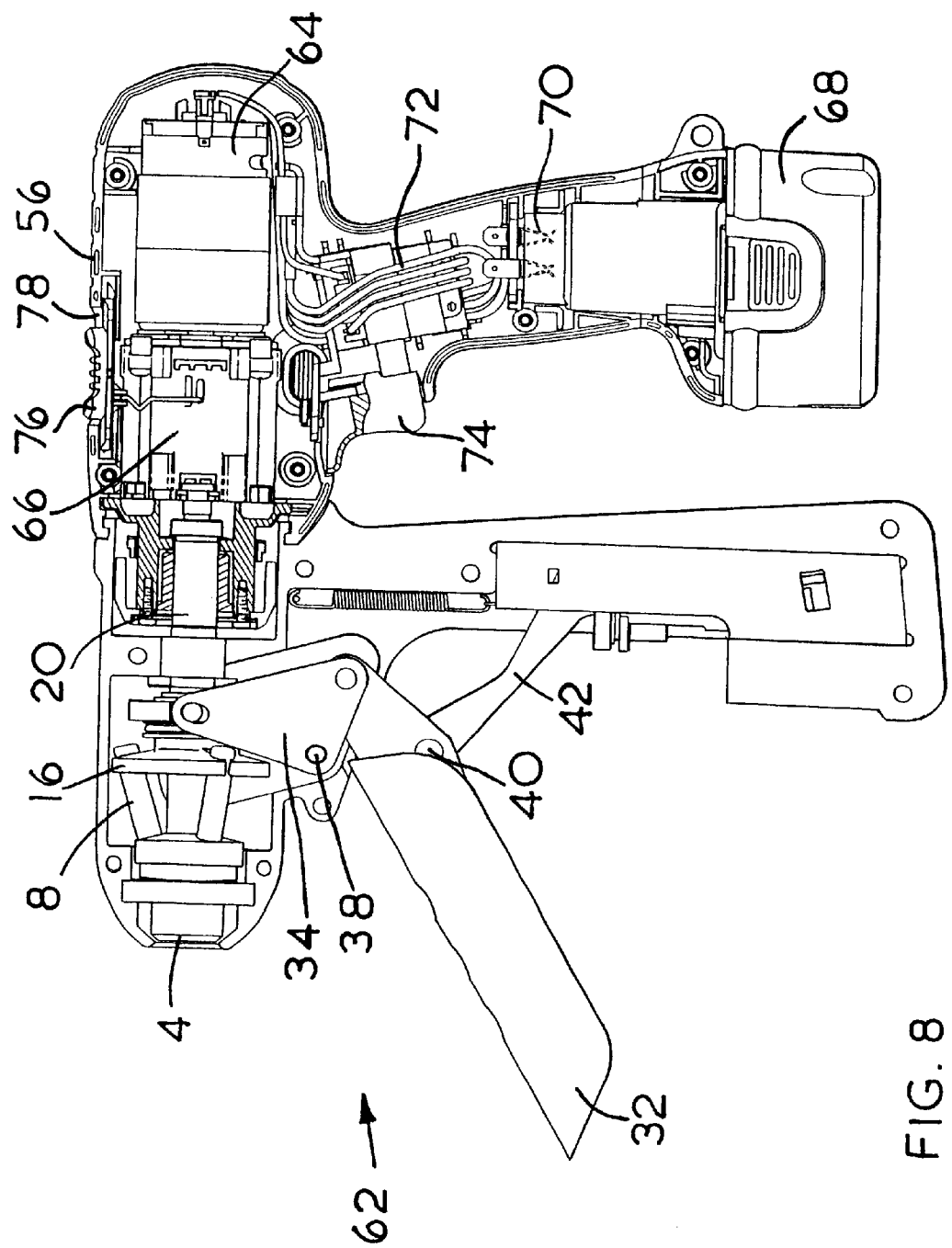
Figure 9:
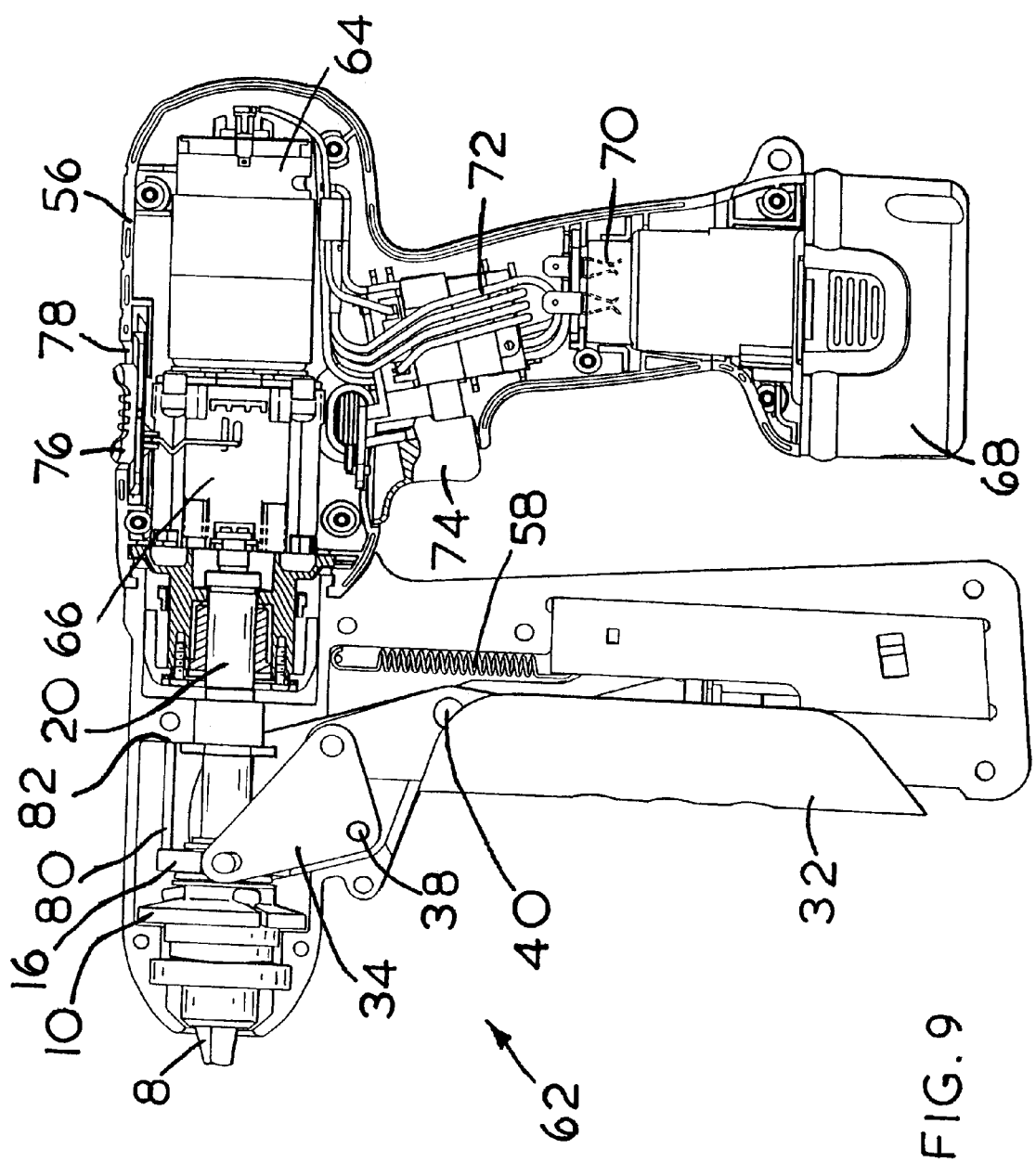
Figure 10:
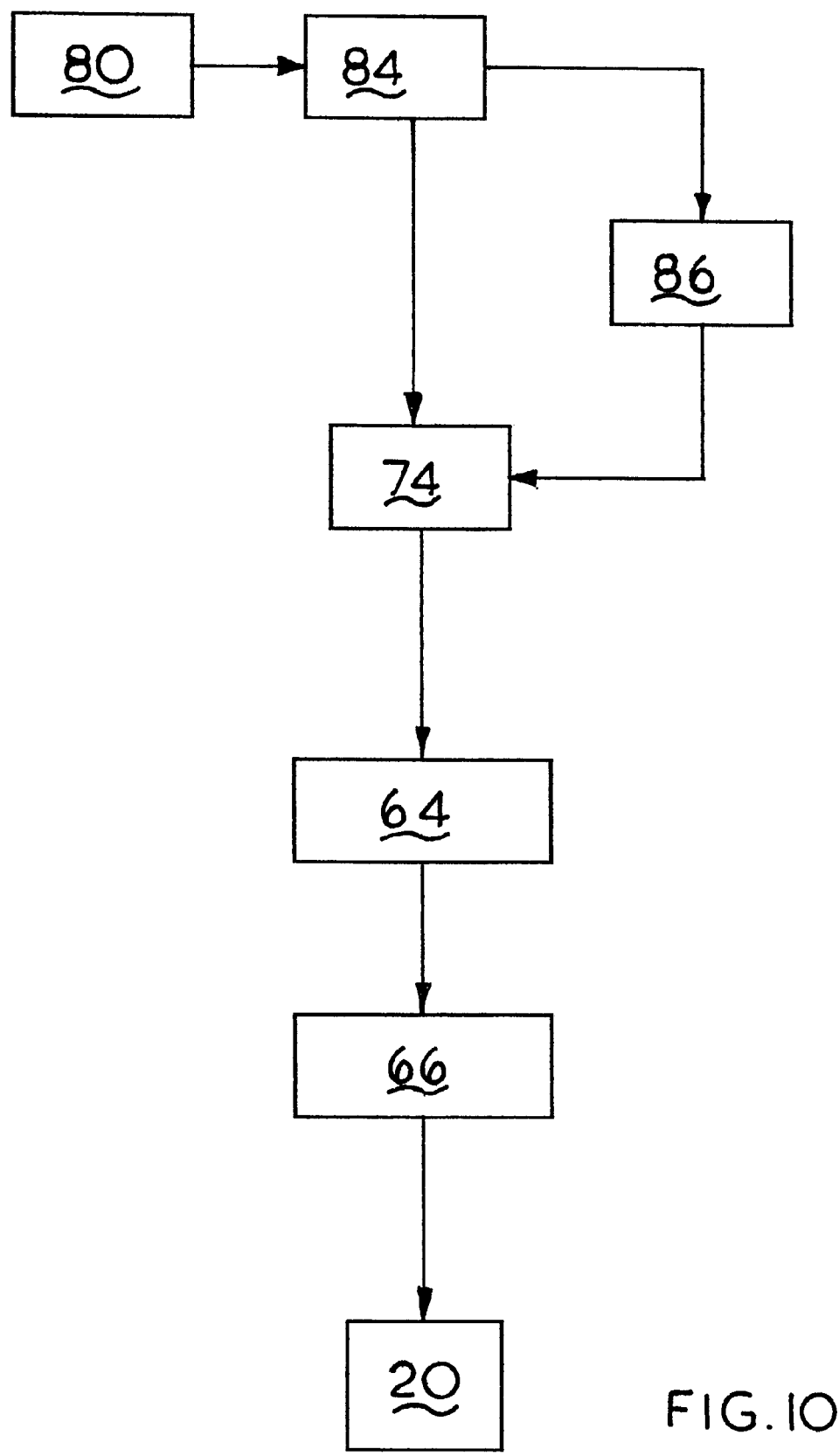

FIGS. 3(a) and (b) illustrate schematically a rear view of the chuck body of FIGS. 1 and 2 and FIG. 3(c) shows a section through the representation of FIG. 2 along the line x—x;

FIGS. 4 and 5 show respectively a chuck in accordance with the present invention wherein the jaws are advanced and then retracted;

FIG. 6 shows the chuck of FIGS. 4 and 5 coupled to a manually operable actuating means with the jaws retracted;

FIG. 7 shows the chuck of FIGS. 4 and 5 coupled to a manually operable actuating means with the jaws advanced;

FIG. 7(a) illustrates the concept of over-centering of the jaw locking means;

FIG. 8 illustrates schematically a drill/driver including a chuck in accordance with an embodiment of the present invention with the jaws in their advanced position;

FIG. 9 illustrates schematically a drill/driver including a chuck in accordance with an embodiment of the present invention with the jaws in their retracted position, and;

FIG. 10 illustrates schematically a circuit for use with an embodiment of the present invention.

Referring now to FIGS. 1,2 and 3 it can be seen that a drill/driver chuck mechanism in accordance with an embodiment of the present invention includes a cylindrical member, a chuck body 2 which has therethrough a central axial bore 4. The central axial bore 4 is formed along an axis 5. The chuck body 2 also has a plurality of further bores 6 formed therein. The bores themselves are straight, yet slanted with respect to the central axial bore 4. This is illustrated most clearly with respect to FIGS. 3a and 3b.

Co-operable with each of the further bores 6 is a respective one of a plurality of chuck jaws 8. It can be seen that, as there are further bores 6, there are therefore three chuck jaws 8. Each of the chuck jaws 8 is able to move within its respective further bore 6 so that it may be advanced or retracted. Although it is possible for each jaw 8 to be advanced and retracted individually, in the embodiment shown herein, the jaws are advanced and retracted concomitantly. This concomitant movement is achieved by virtue of the co-operation between each jaw 8 and a jaw actuator 10. It can be seen particularly from FIG. 1 that the jaw actuator has a plurality of radially extending channels 12 form therein. Indeed, in this example, there are three such channels 12 (because there are three jaws 8). Each jaw 8 co-operates with a respective channel 12 by virtue of the longitudinal flat 14 formed at the rear of each jaw 8. The flat 14 sits within the channel 12. At either side of the flat 14 is the full-diameter of the jaw 8 and this prevents any relative movement between the jaw 8 and the jaw actuator 10 in the longitudinal direction of the jaw (and indeed also along the axis 5).

It will, however, be realised from FIG. 1 that each jaw 8 is able to move radially relative to the jaw actuator 10 within its respective channel 12. This is because the flat 14 is able to move radially inward and outward within the channel 12. This movement will be described further below.

An advantageous feature of the invention, which is shown in the drawings, but is not imperative to achieve the objects of the invention, is inclusion of a thrust plate 16. The purpose of the thrust plate 16 is to convert a force applied thereto into a force for moving the jaw actuator 10. The thrust plate 16 includes spigots 18 the purpose of which will be described further below.

Referring now also to FIGS. 4 and 5 the operation of the chuck will be described (for the purposes of clarity, the thrust plate 16 has not been shown in either FIG. 4 or FIG. 5). FIG. 4 shows the situation when the jaws 8 are advanced within their respective bores 6 and FIG. 5 shows the situation where the jaws 8 are retracted within their bores 6.

Starting from FIG. 5 wherein the jaws are retracted, it can be seen that the left-hand end of the jaws 8 do not project forward and beyond the confines of the cylindrical chuck body 2. In this position therefore, the jaws do not protrude at all within the central axial bore 4. This means that a screwdriver bit or a drill bit (not shown) may be put into the bore 4 of the chuck body 2. The user then needs to advance the jaw actuator 10 in order to advance the jaws 8 within their respective bore 6 so that the jaws advance through their slanted bores 6 to eventually meet beyond the confines of chuck body 2. Reference to FIG. 3c will illustrate this more clearly. It can be seen from FIG. 3c that advancing the jaws moves them both in a radial direction inwardly towards, and an axial direction along, the central bore axis 4.

Of course, if a drill or screwdriver bit is inserted into the bore 4 as the jaws 8 advance along the further bore 6, then eventually the jaws 8 grip the bit (not shown) and therefore will not be in the position shown in FIG. 4. This will be readily appreciated by those skilled in the art.

Whilst FIG. 3c shows how the slanting of the jaws 8 relative to the central axial bore 4 allows the jaws to not only move axially but also radially with respect to the central axis 5, when advanced or retracted, reference to FIGS. 3a and 3b show the radial movement more clearly. In FIG. 3a, the jaw actuator 10 is advanced and therefore the jaws 8 are also advanced within their respective bores 6 and so the jaws 8 meet beyond the confines of the central axial bore 4 (see FIG. 3c). Thus, FIG. 3a shows the case where the rear of each jaw 8 is radially inward towards the central axis 5. This will be understood because each of the flats 14 of the respective jaws 8, has radially moved towards the central axis 5 via the respective slot 12 in the jaw actuator 10.

Conversely, however, reference to FIG. 3b shows the situation wherein each jaw 8 has moved radially outward, as the jaw actuator 10 has been retracted thereby retracting each jaw 8 within the respective bore 6.

Further reference to FIG. 3c shows that the shape of the jaw actuator is chosen to be, essentially conical. Indeed the jaws 8 are held relative to the jaws actuator 10 by virtue of the slots 12 and flats 14 such that the central axis 7 along which each jaw 8 travels is normal to the attitude of the face of the jaw actuator 10. FIG. 3c shows how the plane 9 of the face of the jaw actuator 10 is at ninety degrees to the axis 7 of the jaw 8.

It will be understood that the angle of fifteen degrees between the axis 5 and 7 is maintained regardless of the position of each jaw 8 within the bore 6 (and therefore of the axial disposition of the jaw actuator 10 along the shaft 20 on which it is mounted). Although fifteen degrees has been chosen in this example, any suitable attitude will be acceptable, as long as it is maintained throughout the travel of the jaws and the jaw actuator.

Referring now also to FIGS. 6 and 7, it will be described how the addition of the thrust plate 16 makes advancing and retracting the jaws 8 an easy practical matter. The thrust plate 16 sits on the rear of the collet member 26, which is part of jaw actuator 10. The rear shaft 20 may or may not be integrally formed with the chuck body 2. Indeed the central axial bore 4 of the chuck body 2 may or may not extend within the rear shaft 20. In any event, it can be seen that the thrust plate 16 is concentric with the central axis 5 of the axial bore 4. In this manner, therefore, the thrust plate 16 may axially slide along the shaft 20 in either direction. Preferably, in order to aid the possible rotation of the chuck body 20, jaws 8, and jaw actuator 10, relative to the non-rotating thrust plate 16, a thrust bearing is included between the jaw actuator 10 and thrust plate 16. Preferably the thrust plate 16 also includes a bush 22 to act as a bearing surface between it and the rotatable jaw actuator 10.

The thrust plate 16 is coupled to the jaw actuator 10 by any suitable means. In the example shown, the jaw actuator 10 has an annular recess 24 formed on collet member 26 such that the thrust plate 16 is pushed onto the collet member 26 beyond the annular recess 24 and then a circlip 28 is snap-fitted around the annular recess 24 to hold the thrust plate 16 in place on the collet member 26. It will, of course, be appreciated by those skilled in the art that the collet member 26 may also include an internal bush because this will now contact directly the rear shaft 20. It is an optional feature as to whether the thrust plate 16 is permanently coupled to the jaw actuator 10 in this manner. It is possible for the thrust plate 16 to itself directly contact the rear shaft 20 and simply push or pull the jaw actuator 10 by other means.

Comparing an contrasting FIGS. 6 and 7, it can be seen that in FIG. 6 the jaws 8 are retracted from the chuck body 2, whereas in FIG. 7 the jaws 8 are advanced within (and meet beyond the confines of) the chuck body 2. It will be apparent that the different chuck configuration between FIG. 6 and 7 is achieved by moving the jaw actuator 10 to the right of the rear shaft 20 in FIG. 6, whereas in FIG. 7 the jaw actuator 10 is moved to the left of the rear shaft 20. This means that in FIG. 6 the jaw actuator 10 pulls the jaws 8 so that they are retracted within their respective bores 6, whereas in FIG. 7 the jaw actuator 10 pushes the jaws 8 so that they are advanced within their respective bores 6.

The means by which the jaw actuator 10 is advanced or retracted (or, from viewing FIGS. 6 and 7, move to the left or right along the rear shaft 20) is, in this example, achieved by co-operation between the spigot 18 mounted on thrust plate 16 and a jaw locking means, here a pivoting lever arrangement 32–60. Because any suitable means for advancing or retracting the jaw actuator 10 by virtue of a force applied to the thrust plate 16 may be used, the lever mechanism 32–60 shown herein is simply an example of one of the many means by which this may be achieved.

The pivoting lever mechanism comprises a first handle 32 which is pivotally coupled to an actuator plate 34 and a locking wedge mechanism shown generally as 36 (but to be described in detail hereafter).

Comparing FIG. 6 with FIG. 7, it can be seen that in FIG. 6 the handle 32 is in the open position whereby the actuator plate 34 is pivoted in a clockwise manner relative to a first pivot point 38 thereby retracting the jaw actuator 10 and each jaw 8, whereas in FIG. 7 the handle 32 is in a closed position where the actuator plate 34 is pivoted in an anti-clockwise sense about the first pivot point 38 thereby advancing the jaw actuator 10 and each jaw 8.

An important aspect of the jaw locking mechanism shown in FIG. 6 and 7 is that the advancement of the jaws 8 will stop once a bit inserted into the central axial bore 4 is reached, and a clamping force may be applied to the jaws, regardless of the degree of penetration of the jaws 8 into the central axial bore 4. This means that jaws 8 may be locked within their respective bores 6 regardless of the degree of protrusion of the jaws 8 into the central axial bore 4. This provides significant advantage in that the jaws 8 may, effectively, automatically clamp onto a bit inserted within the central axial bore, and apply a known or given force to this clamping operation, regardless of the diameter of the bit. The operation of the mechanism will be described below.

Starting from FIG. 6 wherein the jaws are in their open position, then to close the jaws 8, the handle 32 is moved so as to pivot about pivot points 40 and 87 in a generally anticlockwise direction as shown by the arrow A. This causes an anticlockwise rotation of the actuator plate 34 about the first pivot point 38 (as has been discussed above). Once the thrust plate 16 has caused the jaw actuator 10 to push the jaws 8 into engagement with a bit inserted into the central axial bore 4, then further pivoting of the actuator plate 34 about first pivot point 38 will not be possible. However, if the handle 32 is still being moved in the direction of arrow A, then this further force will be transferred via the second pivot point 40 and through connecting rod 42 to a first wedge member 44 via a third pivot point 46. In fact, this so called "over-force" causes the first wedge member 44 to move downwards in the direction of arrow C as shown in FIG. 6. A second wedge member 48 is mounted in a further handle 50 (as is the first wedge member 44) and is positioned to co-operatively lock with the first wedge member 44 once the two are in engagement. In this example, though, an intermediate sliding plate 52 is interposed between the two wedges 44, 48 for reasons that will be explained further below.

The second wedge 48 is connected to an adjusting screw member 54 which itself is coupled to the body of a drill 56 via a tension spring 58. The tension in the spring 58 pulls the second wedge member 48 in the opposite direction to the first wedge member 44. It is the position of the second wedge member 48 within the further handle 50 which dictates the position at which the two wedge members 44, 48 lock together. The position at which the two wedge members 44, 48 lock together can be adjusted by the adjusting screw member 54.

The reason for having the position at which the wedge members 44, 48 co-operatively lock together is to set the clamping force applied to the thrust plate 16 by movement of the handle 32 thereby causing pivoting of the actuator plate 34. If the second wedge 48 is situated in a raised position within the further handle 50, then the movement of the first wedge 44 downwards in the direction of arrow C, will not be very far. This means that further movement of the connecting rod 42 will not be possible once the two wedges 44, 48 are locked. Further movement of the handle 32 in the direction of arrow A will thus result in the over-force in the connecting rod 42 being held therewithin as compressive stress, as the connecting rod 42 deforms and bends out of shape. Indeed, this causes an over-centering of the entire locking mechanism, which results in a very high clamping force being felt by the jaws 8.

The position of over-centering is thus dictated by the position of the second wedge 48.

Reference now also to FIG. 7 shows the jaw locking mechanism in its closed position wherein over-centering has occurred. In this example, over-centering occurs when the three pivot points 87, 40 and 46 are not in a straight-line alignment. Such an over-centering locking mechanism will be known to those skilled in the art. In fact, over-centering occurs when pivot point 40 lies to the right hand side (when viewing FIG. 7) of the straight line joining pivot points 87 and 46 (see FIG. 7(a)).

In FIG. 7, it can be seen that the first wedge 44 has moved down within the further handle 50 relative to position shown in FIG. 6.

In order to release the jaws 8, the user needs to open the handle 32 by moving it in the direction of arrow D shown in FIG. 7. This firstly allows the connecting rod 42 to spring back into its original position. This means that there is no more over-centering of the locking mechanism and the potential energy stored within the rod 42 has been released. This then means that further movement of the handle 32 in direction of arrow D allows clockwise rotation of the actuator plate 34 about the first pivot point 38 thereby reversing the action of the jaws as described with reference to FIG. 6.

As has been mentioned hereabove, a sliding plate 52 is interposed between the two wedge members 44, 48. This helps the two wedge members to separate when the jaw locking mechanism is being moved from its closed position to its open position. In this example the plate is made of chrome-plated steel which allows easy sliding of the jaw 44 relative to the jaw 48. In this example, the plate 52 has a fixed position in relation to both wedges 44, 48 with respect to their direction of movement. The plate 52 is, however, able to slide within a recess 60 formed within the further handle 50. This is necessary in order for it to be able to take up the correct attitude in relation to the wedges 44, 48 regardless of the position of the wedge 48 within the further handle 50.

Referring now to FIGS. 8 and 9, there can be seen how a drill/driver, shown generally as 62 incorporates the chuck mechanism described above. The drill/driver shown is actually a drill having an outer body casing 56. The drill includes an electric motor 64 coupled to the shaft 20 via a gearbox mechanism 66. The drill 62 is powered by an electric battery 68 coupled to the motor 64 via battery contacts 70 and electric wires 72. The connection of the battery 68 to the motor 64 via the electric wire 72 is achieved via a trigger switch 74.

Those skilled in the art will appreciate that, for different drilling and driving requirements, the gearbox 66 may exhibit torque/speeds dependant upon the gears selected. For this purpose a gear selector 76 is coupled to the gearbox 66 via an opening 78 in the body casing 56.

It will be apparent that the only differences between FIGS. 8 and 9 are that in FIG. 8 the handle 32 is in its open position whereby the jaws 8 are retracted. Whereas in FIG. 9, the handle 32 is in its closed position such that the jaws 8 are advanced.

Referring now to FIG. 10, there is shown a circuit for use with an embodiment of the present invention. Starting from the position shown FIG. 9, but assuming that a drill bit (not shown) is held rigidly by the jaws 8 within the central axial bore 4, a sensor 80 detects the degree of axial displacement of the thrust plate 16 relative to a fixed position 82 on the body of the drill 62. This sensor co-operates with a potentiometer 84 and a feedback circuit 86 in order to decide how fast the shaft needs to rotate.

It is well known that the speed of rotation of the drill bit can, in certain circumstances, be dependent upon its diameter. Clearly a large diameter bit held by the jaws 8 will result in a small degree of separation between the fixed point 82 and the thrust plate 16. This will be sensed by sensor 80. Conversely, a very small diameter bit will cause a large degree of separation between the fixed point 82 and the thrust plate 16 to be sensed by the sensor 80. In this way, therefore, the output rotational speed of the gearbox 66 may be determined automatically simply by sensing the diameter of the bit held by the jaws 8.

What is claimed is:

1. A drill/driver chuck mechanism including:
   a cylindrical member having a central bore and a plurality of further bores, such that the plurality of further bores are slanted with respect to the axis of the cylindrical member, and co-operate with the central axis bore;
   a plurality of jaws, each being associated with a respective one of the further bores and moveable therewithin;
   a jaw actuator, coupled to each of the jaws of the plurality, for moving the jaws within their respective further bores;
   and jaw locking means arranged to lock the jaws in a predetermined position within their respective bores, said jaw locking means includes a handle;
   the chuck mechanism characterized by the handle moving between an open position and a closed position and wherein, when the jaw locking means is in the open position the jaws are retracted within their respective bores and do not protrude within the central axis bore, and wherein, when the jaw locking means is in the closed position, the jaws are locked within their respective bores regardless of the degree of protrusion of the jaws into the central axis bore.

2. A drill/driver chuck mechanism according to claim 1 wherein the jaw locking means is operatively coupled to the jaw actuator and causes the jaw actuator to move along the axis of the cylindrical member when the jaw locking means is moved between the open position and the closed position.

3. A drill/driver chuck mechanism according to claim 1 wherein the jaw locking means is operatively coupled to the jaw actuator and causes the jaw actuator to move along the axis of the cylindrical member when the jaw locking means is moved between the open position and the closed position.

4. A drill/driver chuck mechanism according to claim 1 wherein the handle is coupled to a pivotable actuator able to pivot under action of the handle moving between the open position and the closed position, thereby to advance or retract the jaws within their respective bores.

5. A drill/driver chuck mechanism according to claim 1 wherein the handle is coupled to a pivotable actuator able to pivot under action of the handle moving between the open position and the closed position, thereby to advance or retract the jaws within their respective bores.

6. A drill/driver chuck mechanism according to claim 3 wherein the handle is coupled to a pivotable actuator able to pivot under action of the handle moving between the open position and the closed position, thereby to advance or retract the jaws within their respective bores.

7. A drill/driver chuck according to claim 1 wherein the jaw locking means has an over-centre locking arrangement.

8. A drill/driver chuck according to claim 1 wherein the jaw locking means includes adjustable biasing means for setting the extent of protrusion of the jaws within the central axis bore.

9. A drill/driver chuck according to claim 1 wherein the jaw locking means includes a pair of co-operable wedge members able to lock against each other.

* * * * *